(12) United States Patent
Lazarus et al.

(10) Patent No.: US 8,647,427 B2
(45) Date of Patent: Feb. 11, 2014

(54) POLYVINYL ESTER-BASED LATEX COATING COMPOSITIONS

(75) Inventors: Etienne Lazarus, Marienthal (FR); Nathalie A. Hahn-Behrens, Soultz sous Forets (FR); Alexander K. Hipp, Zurich (CH)

(73) Assignee: Styron Europe GmbH, Horgen (CH)

( * ) Notice: Subject to any disclaimer, the term of this patent is extended or adjusted under 35 U.S.C. 154(b) by 171 days.

(21) Appl. No.: 12/934,485

(22) PCT Filed: Mar. 26, 2009

(86) PCT No.: PCT/US2009/001923
§ 371 (c)(1),
(2), (4) Date: Mar. 31, 2011

(87) PCT Pub. No.: WO2009/120370
PCT Pub. Date: Oct. 1, 2009

(65) Prior Publication Data
US 2011/0178230 A1    Jul. 21, 2011

Related U.S. Application Data

(60) Provisional application No. 61/072,048, filed on Mar. 27, 2008.

(51) Int. Cl.
*C08F 16/06* (2006.01)
*C08F 18/02* (2006.01)
*C08K 5/00* (2006.01)

(52) U.S. Cl.
USPC ............ 106/400; 106/311; 524/563

(58) Field of Classification Search
USPC ............ 524/563; 106/400, 311
See application file for complete search history.

(56) References Cited

U.S. PATENT DOCUMENTS

| | | | |
|---|---|---|---|
| 3,674,704 A | 7/1972 | Bayless et al. | |
| 4,542,181 A | 9/1985 | Schuppiser et al. | 524/560 |
| 5,041,464 A | 8/1991 | Hoshino et al. | |
| 5,591,799 A | 1/1997 | Bott et al. | |
| 5,874,498 A | 2/1999 | Daniels et al. | 524/563 |
| 2004/0132872 A1* | 7/2004 | Fiedler et al. | 524/47 |

FOREIGN PATENT DOCUMENTS

| | | |
|---|---|---|
| EP | 0067021 A1 | 12/1982 |
| GB | 1340398 | 12/1973 |
| JP | 171819 | 11/1944 |
| JP | 63-186751 | 8/1988 |
| JP | 06-136221 | 5/1994 |
| JP | 2003-020309 | 1/2003 |
| WO | WO 02/090429 A2 | 11/2002 |

OTHER PUBLICATIONS

H. Y. Erbil, Vinyl Acetate Emulsion Polymerization and Copolymerization with Acrylic Monomers, 2000, pp. 142-154, CRC Press LLC, Boca Raton, FL, US.
H. R. Kricheldorf et al., eds., Handbook of Polymer Synthesis, 2d ed., 2005, pp. 175-176, Marcel Dekkar, New York, NY, US.
Sodium acetate trihydrate buffer, dated 2003, pp. 1-2, Hampton Research, available at http://hamptonresearch.com/product_detail.aspx?cid=4&sid=70&pid=133.

* cited by examiner

*Primary Examiner* — Kelechi Egwim
(74) *Attorney, Agent, or Firm* — Brinks, Gilson & Lione

(57) ABSTRACT

Embodiments of the present disclosure include a polyvinyl ester-based latex having polyvinyl ester-based particles with vinyl ester groups that have been partially hydrolyzed to a predetermined degree, and methods of modifying and forming the polyvinyl ester-based latex of the present disclosure. Embodiments of the present disclosure also include coating compositions that include the polyvinyl ester-based latex of the present disclosure and an optical brightening agent (OBA), where the polyvinyl ester-based particles act as a carrier for the OBA in a coating composition for a print media substrate.

8 Claims, 6 Drawing Sheets

POLYVINYL ESTER-BASED LATEX COATING COMPOSITIONS

RELATED APPLICATIONS

This application is the National Stage of International Application No. PCT/US2009/001923, filed Mar. 26, 2009, which claims the benefit of U.S. Provisional Application No. 61/072,048, filed Mar. 27, 2008. The entire contents of both of the above-identified documents are hereby incorporated by reference in their entireties.

FIELD OF THE DISCLOSURE

The present disclosure generally relates to polyvinyl ester-based latexes that have been partially hydrolyzed and their use in coating compositions as carriers for optical brightening agents.

BACKGROUND

Paper coating compositions are used in the paper industry to provide various physical properties and desired appearances to paper. Generally, paper coating compositions are composed of an aqueous dispersion that include pigments (e.g., clay, calcium carbonate, and/or titanium dioxide) and binders, among other components.

Paper coating compositions can be applied to a continuous web of paper by high speed coating machines, such as blade coaters, air knife coaters, rod coaters, and roll coaters. It can be advantageous to use faster coaters to increase productivity and to use higher solids coating compositions to decrease drying costs and improve binder distribution. So, the flow properties of the paper coating composition are important with regard to the rheology and runability of the composition during the coating operation.

Coating compositions often include a thickener to control flow properties of the paper coating composition. The coating compositions can also include components such humectants, lubricants, defoamers, crosslinkers, and optical brightening agents (OBAs). While OBAs alone work well in the coating composition, the use of polyvinyl alcohol (PVOH) in the coating composition boosts their performance. The exact mechanism of how and why this occurs is not fully understood, but it is believed that PVOH forms a complex with the OBA, thereby fixing the OBA in its active conformation (P. Hentzschel, Polyvinyl Alcohol, in: Pigment Coating and Surface Sizing, Fapet Oy, Helsinki, 2000).

PVOH can be supplied to papermakers in a variety of forms. These forms can include a dry resin that is brought into an aqueous solution at about 20 percent by weight to about 30 percent by weight solids by the customer. The advantage with this approach is that less costly grades of PVOH can be used. Another form of PVOH is one that has been pre-dissolved by the manufacture and delivered to the customer at about 15 percent by weight to about 25 percent by weight solids. This is costly to the papermaker as it involves shipping mostly water. Finally, PVOH can be supplied as dry, fine particle size grades that are added dry to the paper coating composition. This latter product is a relatively expensive ground material, but is convenient if on-site suspension is not possible.

Regardless of the form, the percentage of PVOH solids in the coating composition is typically limited by the viscosity required for the paper coating process. In addition, the PVOH can oftentimes interact strongly with the binder and pigments in the paper coating. The result is a paper coating composition having poor rheology and a negative impact on the paper coating process. As a result, a suitable alternative to the use of PVOH as a carrier for OBAs in paper coating is desired.

SUMMARY

Embodiments of the present disclosure include a polyvinyl ester (PVE)-based latex having PVE-based particles with vinyl ester groups that have been partially hydrolyzed to a predetermined degree, and methods of modifying and forming the PVE-based latex of the present disclosure. Embodiments of the present disclosure also include coating compositions that include the PVE-based latex of the present disclosure and an optical brightening agent (OBA), where the PVE-based particles act as a carrier for the OBA in a coating composition for a print media substrate.

For the various embodiments, the PVE-based particles of the disclosure can help to improve the appearance and brightness of the print media substrate on which the coating composition is applied. This is accomplished by the PVE-based particles associating with and carrying the OBA in the coating composition to the substrate on which the coating composition is applied. For the various embodiments, the predetermined degree of partially hydrolyzed vinyl ester groups has an essentially linear correlation with an amount of the OBA carried by the PVE-based particles. This allows for an amount of the OBA carried in the coating composition to be adjusted by adjusting the predetermined degree of hydrolysis of the PVE-based particles.

In addition, the use of the PVE-based particles of the disclosure eliminates the need for using PVOH thereby eliminating the problems associated with its use as discussed herein. Furthermore, a higher weight percentage of the PVE-based particles can be maintained in the coating composition as compared to the use of PVOH. In addition, the PVE-based particles of the present disclosure can provide equivalent OBA carrier efficiency and binding strength as compared to the use of PVOH, while providing both improved rheology and allowing a higher weight percentage for solids in the paper coating composition.

For the various embodiments, the coating composition of the present disclosure can include additional components. Examples of such additional components can include, but are not limited to, a pigment that may be selected from a variety of suitable systems, including clay and calcium carbonate, lubricants, defoamers, a binder, and other conventional additives. For the various embodiments, the addition of a binder to the PVE-based latex of the present disclosure provides for a binder composition for the coating composition, as will be discussed more fully herein.

For the various embodiments, the PVE-based particles and the binder that forms the binder composition can be present in an amount from about 0.125 to about 3 parts of polyvinyl ester-based particles to binder. In an additional embodiment, the binder composition can be present in the coating composition in an amount from about 3 parts to about 25 parts per 100 parts of a pigment or pigment blend.

For the various embodiments, the predetermined degree of hydrolysis of the PVE-based particles can be from 5 to 80 percent of the vinyl ester groups. In additional embodiments, the predetermined degree of hydrolysis of the PVE-based particles can be from 10 to 50 percent of the vinyl ester groups. Partial hydrolysis of the predetermined percentage of the vinyl ester groups of the PVE-based particles can be accomplished by reacting the vinyl ester groups with a predetermined molar amount of a base. Alternatively, partially hydrolyzing the predetermined percentage of the vinyl ester groups of the PVE-based particles can be accomplished by reacting the vinyl ester groups with a predetermined molar amount of a water-soluble acid.

For the various embodiments, the PVE-based particles are homopolymers or copolymers formed from monomers selected from the group consisting of vinyl acetate, vinyl propionate, and vinyl butyrate. Alternatively, the PVE-based particles are copolymers formed from monomers selected from the group consisting of vinyl acetate, vinyl propionate, and vinyl butyrate and at least one other dissimilar monomer. Examples of the at least one other dissimilar monomer are selected from the group consisting of ethylene, vinyl versatate, acrylate, methacrylate, and carboxylic acids. Other monomers could also be used in forming the copolymer of the PVE-based particles. For the various embodiments, mixtures of the homopolymers and the copolymers can be used in forming the polyvinyl ester-based particles of the latex.

So, for the various embodiments, a specific example of the PVE-based latex can be a polyvinyl acetate (PVAc)-based latex having PVAc-based particles with acetate groups that have been partially hydrolyzed to a predetermined degree, and methods of modifying and forming the PVAc-based latex are included in embodiments of the present disclosure. Embodiments of the present disclosure also include coating compositions that include the PVAc-based latex of the present disclosure and the OBA, where the PVAc-based particles act as a carrier for the OBA in the coating composition for the print media substrate.

The embodiments of the present disclosure also include a method of carrying the OBA in the coating composition. The method includes providing in the coating composition the PVE-based latex of the present disclosure along with the OBA that associates with the polyvinyl ester-based particles, and coating at least one side of a print media substrate with the coating composition, where the polyvinyl ester-based particles act as the optical brightening agent carrier.

Definitions

As used herein, the term "print media substrate" includes substrates having a surface on which printing can occur and which can be modified by the embodiments of the coating compositions and methods provided herein. Examples of print media substrates include, but are not limited to, paper and/or paperboard of different thickness, strength, and/or weight. As appreciated, paper and/or paperboard can be formed from an amalgamation of fibers that can include, at least in part, vegetable and/or wood fibers, such as cellulose, hemicelluloses, lignin, and/or synthetic fibers. In addition, other components can be included in the print media substrate.

Other print media substrates can also include vellum, clear film, matte film, coated paper, heavyweight coated paper, high-gloss photo paper, semi-gloss photo paper, paper-based semi-gloss, satin poster paper, canvas, mylar, sepia, blueprints, plastic film, plastic laminate, foam board, and cardboard, to name but a few.

As used herein, a "suspension" includes a system in which very small particles (solid, semisolid, or liquid) are more or less uniformly dispersed in a liquid medium (e.g., water).

As used herein, a "binder composition" includes a combination of the PVE-based latex with its PVE-based particles and at least one additional binder.

As used in the herein, "polyvinyl ester-based latex", "polyvinyl ester-based particles", "polyvinyl ester" and "vinyl ester" may be substituted throughout the disclosure with "polyvinyl acetate-based latex", "polyvinyl acetate-based particles", "polyvinyl acetate" and "vinyl acetate", respectively, except where the context would clearly not allow for such a substitution. If such a substitution is made, a substitution of the respective pendant groups that undergo hydrolysis according to the present disclosure is also made (e.g., when "polyvinyl ester-based latex", "polyvinyl ester-based particles" and/or "polyvinyl ester" are substituted with "polyvinyl acetate-based latex", "polyvinyl acetate-based particles" and "polyvinyl acetate", respectively, the "vinyl ester groups" are also substituted with "acetate groups", except where the context would clearly not allow for such a substitution).

As used herein, "polyvinyl ester" describes a polymer chain comprising polymerized monomer units of the general structure: $H_2C=CH-O-(C=O)-R$, where R is an alkyl chain and where the ester functional group $R-(C=O)-O-$ of the pendant group can undergo hydrolysis as discussed herein. By extension, the term "vinyl ester groups" is used to describe the ester functional groups even after polymerization of the vinyl ester monomer.

As used herein, "polyvinyl acetate" describes a polymer chain comprising polymerized monomer units of the general structure: $H_2C=CH-O-(C=-)-R$, where R is a methyl group and where the acetate functional group $CH_3-(C=O)-O-$ of the pendant group can undergo hydrolysis as discussed herein.

As used herein, "PVE" is an abbreviation for polyvinyl ester.

As used herein, "PVAc" is an abbreviation for polyvinyl acetate.

As used herein, a "solution" includes a uniformly dispersed mixture at the molecular or ionic level, of one or more substances in one or more other substances.

Units for the components of the coating composition are expressed as dry parts per 100 pigments. Parts refer to dry parts by weight unless otherwise stated.

As used herein, the terms "a," "an," "the," "one or more," and "at least one" are used interchangeably and include plural referents unless the context clearly dictates otherwise. Unless defined otherwise, all scientific and technical terms are understood to have the same meaning as commonly used in the art to which they pertain.

DETAILED DESCRIPTION

Figure 1:
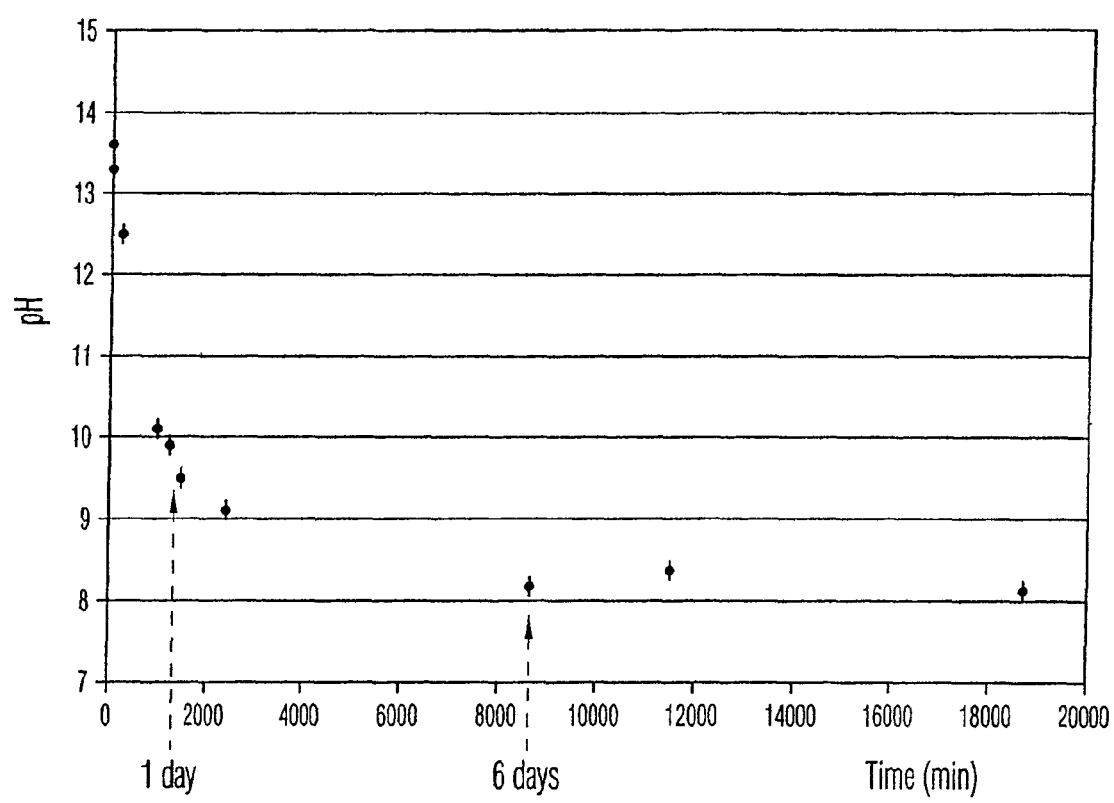
FIG. 1 illustrates a change in pH during the partial hydrolysis of a PVAc latex to form a PVAC-based latex of the present disclosure.

Embodiments of the present disclosure include a polyvinyl ester (PVE)-based latex having PVE-based particles with vinyl ester groups partially hydrolyzed to a predetermined degree, and methods for forming the PVE-based latex. For the various embodiments, the PVE-based latex can be formed by the modification of a PVE latex through partial hydrolysis of vinyl ester groups on the PVE-based particles to the predetermined degree.

Embodiments of the present disclosure also include coating compositions for a print media substrate that include the PVE-based latex and an optical brightening agent (OBA), and methods of applying and using the coating compositions. For the various embodiments, the PVE-based particles act as a carrier for the OBA in the coating compositions. The PVE-based particles exhibit beneficial characteristics in comparison to the use of polyvinyl alcohol (PVOH) as the carrier for OBAs. These include the ability to incorporate a higher weight percentage of the PVE-based particles into the coating composition as compared to the use of PVOH, while still providing an equivalent OBA carrying efficiency and good binding strength as compared to PVOH. In addition, there are improvements in the rheology of the coating composition when using the PVE-based latex as compared to the use of PVOH. For example, lower high shear viscosity can be observed for coating compositions that use the PVE-based latex as compared to the use of PVOH.

For the various embodiments, the coating compositions of the present disclosure are aqueous based suspensions that include the PVE-based latex, and an OBA. Optionally, coating compositions of the present disclosure may also include additional components (either in suspension or dissolved therein) for enhancing and/or producing a desired coating rheological and/or finished coating properties in the resulting print media substrate coated with the coating composition. Such additional components can include, but are not limited to, pigments, binders (in addition to the PVE-based latex), dispersing agents, protective colloids, solvents for the colloids, sequestering agents, thickeners, humectants, lubricants, surfactants, wetting agents, crosslinkers, and the like. In addition, the coating composition of the present disclosure can include one or more of a plasticizer, a filler, and/or water retention aids such as carboxymethyl cellulose and so forth.

The PVE latex used in forming the PVE-based latex of the present disclosure can be formed in a number of ways. For example, the PVE latex can be formed by polymerizing or copolymerizing appropriate monomers in, for example, an emulsion polymerization process, as are known. The emulsion polymerization used in forming the PVE latex of the present disclosure can be initiated by a free radical initiator. Typical free radical initiators useful in the present disclosure include conventional redox systems, peroxide systems, azo derivatives, and hydroperoxide systems.

The emulsion polymerization can typically be carried out at a temperature in the range from about 50 degrees Celsius (° C.) to about 90° C. Monomer conversion can typically range from about 95 to above about 99 percent. The PVE-particles prepared in the latex typically have a solids content of about 45 to about 60 percent; a viscosity of about 200 to about 5000 centipoise; and a particle size of about 100 to about 3000 nanometers.

The PVE latex used in the present disclosure can be prepared from vinyl ester monomers alone or from a combination of vinyl ester monomers and at least one other dissimilar monomer. An example of a suitable vinyl ester monomer useful in the present disclosure can include commercially available vinyl ester monomers. Examples of such vinyl ester monomers include, but are not limited to, vinyl propionate and vinyl butyrate, both of which can be hydrolyzed. Other vinyl ester monomers could also be used to prepare the PVE latex having PVE-based particles with vinyl ester groups that have been partially hydrolyzed to the predetermined degree.

Examples of the at least one other dissimilar monomer for use in forming copolymers of the PVE-based particles can be monomers which are capable of undergoing copolymerization with the vinyl ester monomers described above. Such dissimilar monomers useful in the present disclosure include, but are not limited to, those selected from the group consisting of ethylene monomers, vinyl versatate monomers, acrylate monomers, methacrylate monomers and combinations thereof. Specific examples of such monomers include, but are not limited to, butylacrylate monomers, 2-ethylhexyl acrylate monomer, dibutylmaleate monomer, ethylene monomer, vinylneodecanoate monomer, vinylneononanoate monomer, vinyl esters of Versatic™ acids (available from Hexion Specialty Chemicals Inc., Columbus, Ohio) and combinations thereof. Other vinyl ester monomers could also be used in combination with vinyl acetate monomers in preparing the PVE latex. Examples of such vinyl ester monomers include, but are not limited to, vinyl propionate and vinyl butyrate.

Heteropolymers that include vinyl acetate and at least two or more dissimilar monomers are also possible. The dissimilar monomers are typically utilized in an amount ranging from about 5 to about 80 percent by weight of the total monomers utilized to form the PVAc latex. For the various embodiments, the resulting PVE latexes formed from the homopolymerization and the copolymerization can also be combined in mixtures and used in forming the PVE-based latex of the present disclosure.

In an additional embodiment, the PVE latex used in the present disclosure can be obtained from commercial suppliers, such as UCAR™ latex from The Dow Chemical Company (Midland, Md.), Latexia® from Ciba Specialty Chemicals (Basel Switzerland), Synthemul™ from Dow Reichhold Specialty Latex, LLC (Research Triangle Park, N.C.), and Rexyn® from Celanese Corporation (Dallas, Tex.).

For the various embodiments, the predetermined degree of hydrolysis of the PVE-based particles can be from 5 to 80 percent of the vinyl ester groups. In additional embodiments, the predetermined degree of hydrolysis of the PVE-based particles can be from 10 to 50 percent of the vinyl ester groups. Partial hydrolysis of the predetermined percentage of the vinyl ester groups of the PVE-based particles can be accomplished by reacting the vinyl ester groups in the PVE-based particles with a predetermined molar amount of a base. Examples of the base include, but are not limited to, an aqueous sodium hydroxide solution, potassium hydroxide solution, and ammonium hydroxide.

Alternatively, partially hydrolyzing the predetermined percentage of the vinyl ester groups of the PVE-based particles can be accomplished by reacting the vinyl ester groups in the PVE-based particles with a predetermined molar amount of a water-soluble acid. Examples of water-soluble acid include, but are not limited to, sulfuric acid and hydrochloric acid.

The resulting PVE-based latex can then be used in the coating composition and/or formulated with at least one additional binder to form a binder composition. With respect to the binder composition, formulating the PVE-based latex directly with the binder to form the binder composition can help to avoid a pre-dissolution step in forming the coating composition and being in the form of a dispersion the formulation can help to minimize a negative impact on rheology. For the various embodiments, the binder composition can be produced separate of the coating composition as a liquid dispersion. In other words, the binder composition is a dispersion of the PVE-based latex with its PVE-based particles (a binder itself) and at least one additional binder. For the various embodiments, the PVE-based particles and the binder that form the binder composition can have a weight ratio of 1:8 to 3:1 parts of PVE-based particles to binder. In other terms, for the various embodiments the PVE-based particles and the binder that form the binder composition can be present in an amount from about 0.125 to about 3 parts of polyvinyl ester-based particles to binder.

Binders for the coating composition and/or the binder composition can be selected from a number of binders useful for binding the pigment particles and other solids in the coating composition. Binder selection can be based in part on at least their ability to modify the rheology and water retention of the coating composition. Binder selection can also depend on the print media substrate end use application.

Examples of suitable binders include, but are not limited to, those selected from the group consisting of styrene butadiene, styrene butadiene acrylonitrile, carboxylated styrene butadiene, carboxylated styrene butadiene acrylonitrile, styrene acrylate, carboxylated styrene acrylate, (carboxymethyl)cellulose, natural protein materials such as casein or soy protein, starch, polyvinyl alcohol, polyvinyl acetate homopolymers and copolymers, acrylic latex, natural occurring latex materials, and ethylene vinyl acetate copolymers and combinations thereof. The addition of other binders is possible. These binders can include, but are not limited to, carboxylic acids or other modifiers at small levels (typically below 6 parts per 100 parts monomer).

For the various embodiments, the coating composition includes the PVE-based latex or the binder composition, as discussed above, and the OBA, where the polyvinyl ester-based particles act as a carrier for the OBA. Surprisingly, the predetermined degree of partially hydrolyzed vinyl ester groups of the PVE-based particles has an essentially linear correlation with an amount of the optical brightening agent carried by the polyvinyl ester-based particles. So, an amount of the OBA carried in the coating composition can be adjusted by selecting and/or adjusting the predetermined degree of hydrolysis of the polyvinyl ester-based particles for a given weight percentage of the PVE-based particles.

Examples of suitable OBAs include, but are not limited to, whiteners, fluorescence agents, colorants, combinations thereof, or the like. Specific examples include stilbene derivatives, benzoxasols and thiophenates, such as derivatives of bis(triazinylamino)stilbene, 4,4'-diaminostilben-2,2'disulfo, 4,4'-bis(benzoxazol-2-yl)stilbene, 2,5-(di-5-tert-butylbenzoyl)thiophenate, 2,2'-(1,2-Ethenediyldi-4,1-phenylene)bis-benzoxazole, and combinations thereof. Other OBAs include those sold under the trade designator UVITEX OB and TINOPAL (Ciba Specialty Chemicals, Basel Switzerland), BLANKOPHOR (Lanxess, Germany), and HOSTALUX and LEUCOPHOR (Clariant, Switzerland). Other OBA and/or combinations of OBAs are also possible.

As discussed above, the coating compositions of the present disclosure may also include additional components (either in suspension or dissolved therein) for enhancing and/or producing a desired coating rheological and/or finished coating properties in the resulting print media substrate coated with the coating composition. Such additional components can include, but are not limited to, pigments, dispersing agents, protective colloids, solvents for the colloids, sequestering agents, and the like.

Pigments for the coating composition may be selected from a number of different pigments useful for coating compositions. Examples of such pigments include, but are not limited to, solid and/or hollow plastic pigments, aqueous dispersions of coating grade clays, such as kaolin clays, titanium dioxide, calcium carbonate, barium sulfate, talc, zinc sulfate, aluminum sulfate, calcium oxide reaction products, lithopone, zinc sulfide, other coating pigments, other similar materials, and mixtures thereof. The PVE-based latex of the present disclosure may also be blended with solid and/or hollow plastic pigments before being added to the coating composition. Additionally, the coating composition may also contain other additives, such as zinc oxide and/or a small amount of a dispersing or stabilizing agent, such as polyacrylic acid copolymers or tetra-sodium pyrophosphate.

With respect to other optional components for the coating composition, these can include, but are not limited to, lubricants and defoamers. Examples of a lubricant for use with the coating composition include, but are not limited to, calcium stearate, polyethylene emulsions, and polyglyceride. For the various embodiments, the composition may include up to 1 part of lubricant for every 100 parts of pigment. Examples of a defoamer for use with the coating composition include, but are not limited to, products based on paraffinic mineral oil, fatty acid or silicone such as Nopcomaster (Nopco Paper Technology, Norway) or Etingal (BASF, Germany). For the various embodiments, the composition may include up to 0.5 parts of defoamer for every 100 parts of pigment.

PVE-based latex can be included in the coating composition in an amount for every 100 parts of pigment, where this amount can have a workable range to achieve a coating for the print media substrate having desired qualities of whiteness, brightness, binding strength, and decreased color reversion. For example, the coating composition can include a collective amount of PVE-based particles and other binder(s) of about 3 parts per 100 parts pigment to about 25 parts per 100 parts pigment. Alternatively, the additional binder is absent and the PVE-based particles from the PVE-based latex are the only binder present in the coating composition. For the various embodiments, the coating composition of the present disclosure may include, in general, up to 3 to 4 parts of the OBA for every 100 parts of pigment.

It is to be understood that the above description has been made in an illustrative fashion, and not a restrictive one. Although specific embodiments have been illustrated and described herein, those of ordinary skill in the art will appreciate that other component arrangements can be substituted for the specific embodiments shown. The claims are intended to cover such adaptations or variations of various embodiments of the disclosure, except to the extent limited by the prior art.

Embodiments of the present disclosure further include methods of applying the coating composition, and substrates that has been coated with the coating composition that includes the PVE-based latex of the present disclosure.

In the foregoing Detailed Description, various features are grouped together in exemplary embodiments for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

The present disclosure is further illustrated by the following examples. It is to be understood that the particular examples, materials, amounts, and procedures are to be interpreted broadly in accordance with the scope and spirit of the disclosure as set forth herein.

EXAMPLES

Various aspects of the present disclosure are illustrated by the following examples. It is to be understood that the particular examples, materials, amounts, and procedures are to be interpreted broadly in accordance with the scope of the disclosure as set forth herein. Unless otherwise indicated, all parts and percentages are by weight based on dry material.

Unless otherwise specified, all chemicals used are commercially available as indicated herein.

Example 1

500 g of a polyvinyl acetate (PVAc)-latex XZ 92806 (The Dow Chemical Company, Midland, Mich.) containing 40 weight percent solids of PVAc-particles (homopolymer) is partially hydrolyzed at room temperature by adding 186.4 g of a 10% by weight sodium hydroxide solution. This amount of base corresponds to a degree of hydrolysis of 20 percent for the acetate functionality groups in the PVAc-particles. FIG. 1 illustrates the pH of the dispersion decreasing over time from around pH 13 down to around pH 8.5 after 3 days. The resulting PVAc-based latex shows good storage stability over at least 2 months.

The PVAc-based latex is then blended with a styrene butadiene binder DL 920 (The Dow Chemical Company, Midland Mich.) at 12.5%, 25%, 37.5%, and 50% by weight of total polymer content of the blend. Each of the resulting blends is then used at 10 parts dry polymer in a coating composition containing 100 parts calcium carbonate sold under trade designator HYDROCARB 90 (Omya, Inc, Proctor Vt.) and 1 part OBA sold under trade designator TINOPAL ABP-Z (Ciba Specialty Chemicals, Basel Switzerland).

The pH of the coating composition is then adjusted to pH 8.5 with a 10% by weight NaOH solution and to a solid composition of 70%. The different coating compositions are then coated onto wood-free paper and compared to formulations prepared with a PVOH in powder form sold under the trade designator Mowiol 6-98 (Kuraray Co. Ltd., Tokyo, Japan).

The coating formulation is applied onto the wood-free paper substrate of 65 g/m$^2$ at a coat weight of 14 g/cm$^2$ and then dried to a moisture content of 4.5% using a continuous laboratory-scale coater at 36 meters per minute (m/min). The paper is calendered with a laboratory-scale calender using two nips per side at a temperature of 70° C., using a constant moderate pressure throughout the experiment.

The levels of the PVOH are 0.25, 0.5, 0.75 and 1 part based on 100 parts pigment. These levels correspond to equivalent number of hydroxyl groups as in the coating compositions having the different weight percentages of PVAc-based latex and the styrene butadiene binder provided above.

Figure 2A:
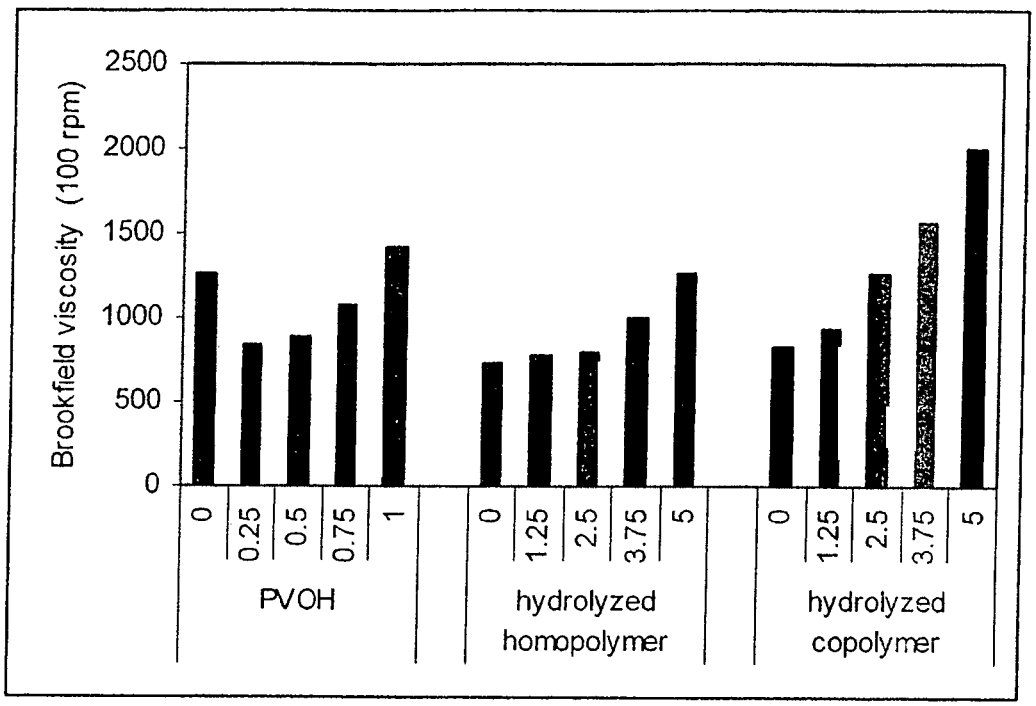
FIGS. 2A-2E illustrate viscosity (FIGS. 2A-2C), Pick test (FIG. 2D), and brightness (FIG. 2E) test results for coating compositions having PVAc-based latexes of the present disclosure as compared to a coating composition having PVOH.

The viscosity of the coating compositions containing the PVAc-based latex and those containing the PVOH are then compared. FIGS. 2A-2E illustrate comparisons of the coating compositions that include the Mowiol 6-98 and those that contain the PVAc-based latex. As illustrated in FIG. 2A, the coating compositions that include the PVAc-based latex (homopolymer) provide a lower Brookfield viscosity (spindle 4 at 100 rpm) for the equivalent number of hydroxyl groups in the coating compositions.

Figure 2B:
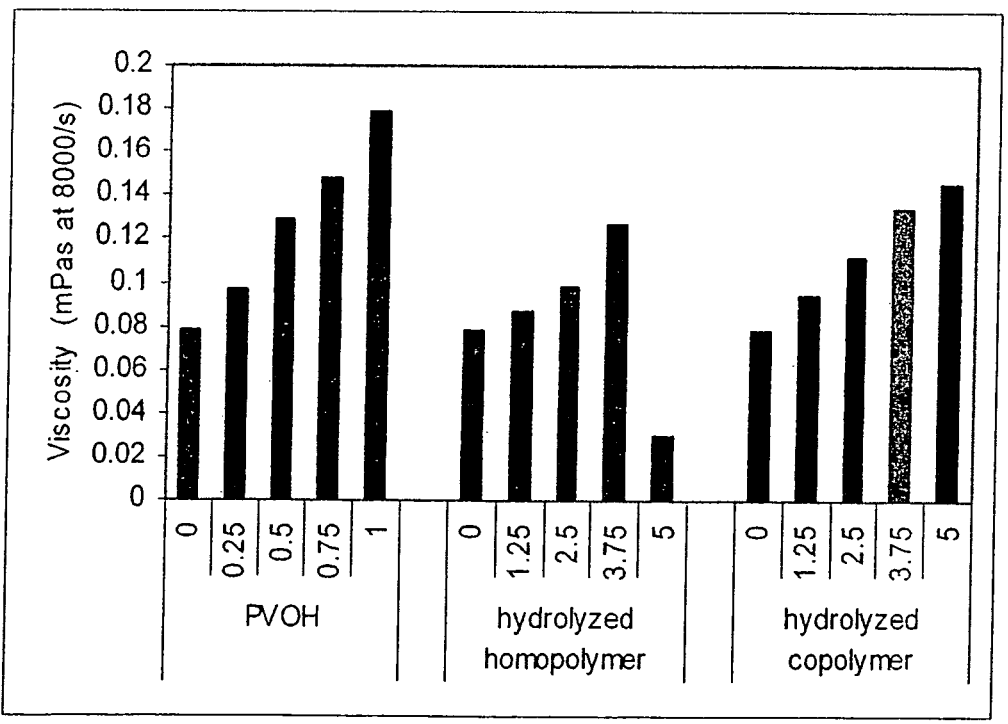

FIG. 2B illustrates that the coating compositions that include the PVAc-based latex have a lower viscosity at increasing shear rates as compared to those containing the PVOH. For this test, the viscosity is measured with a Physica MCR 301 cone-plate rheometer (Anton Par, Austria).

Figure 2C:
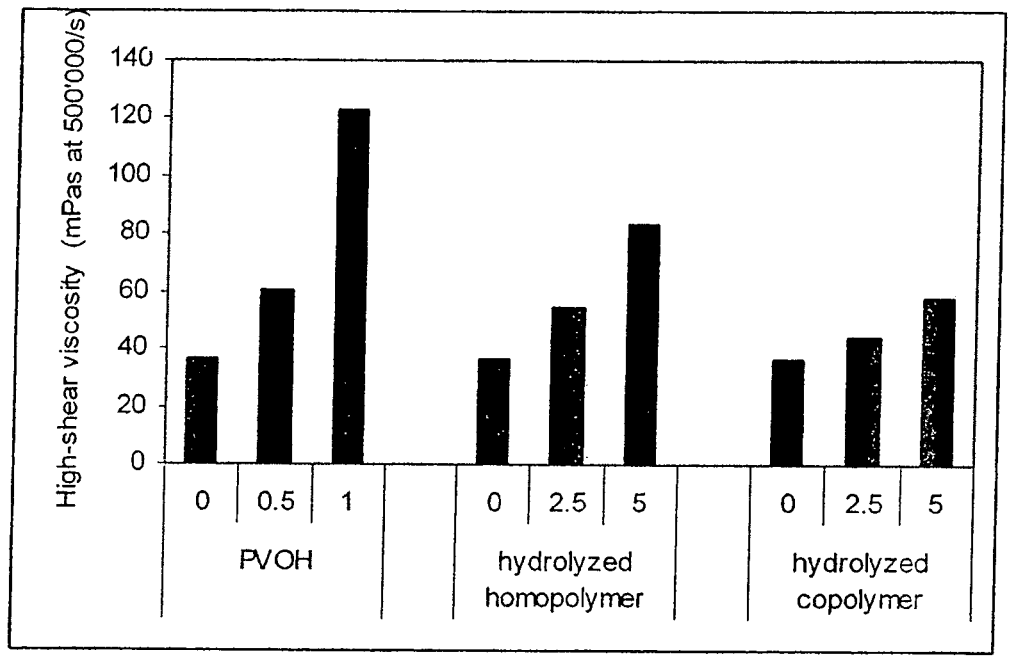

An ACAV A2 capillary rheometer (ACA Systems, Oy, Finland) with a diameter of the capillary of 0.4 mm is used to measure the high-shear viscosity (500,000/sec) of the coating compositions provided above. FIG. 2C provides results that indicate that the coating compositions that include the PVAc-based latex (homopolymer) have a lower viscosity at increasing shear rates as compared to those containing the PVOH.

Figure 2D:
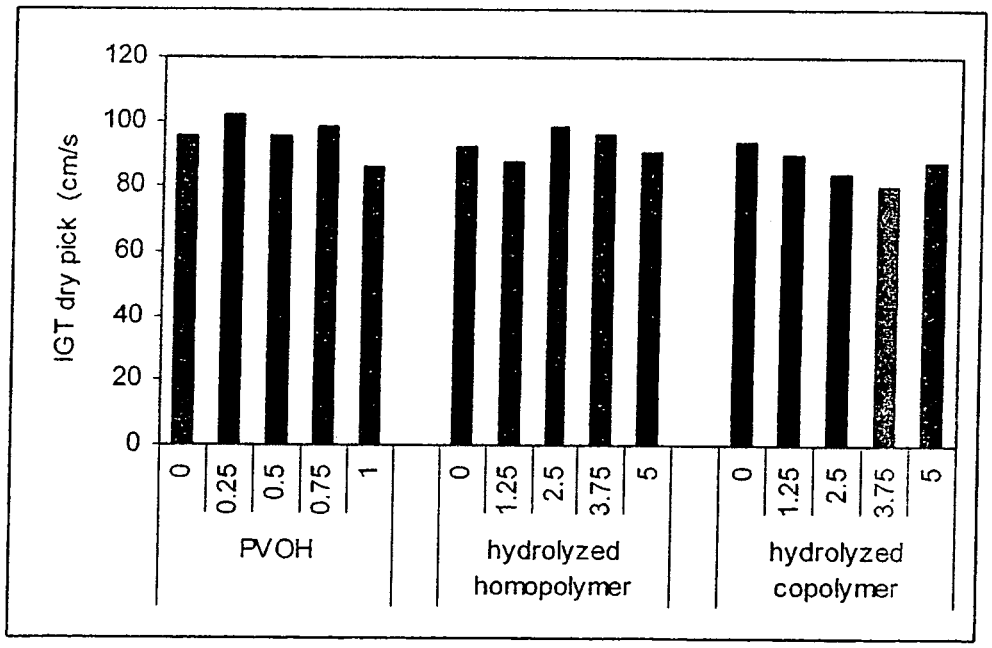
Figure 2E:
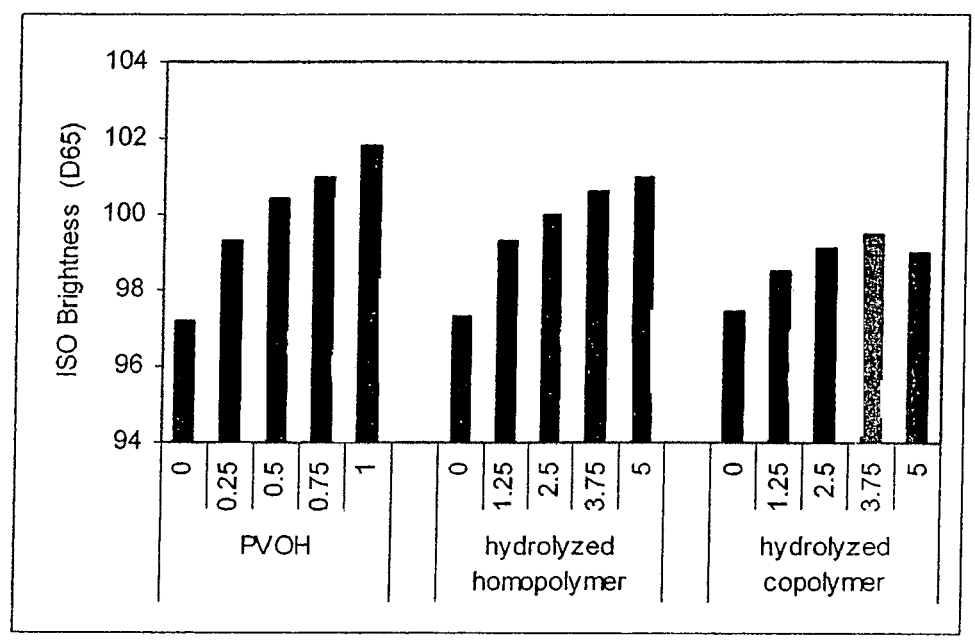

The coating binding strength for the coating compositions are also measured using IGT Pick testing. The IGT Pick testing is carried out on an A2 type printability tester (IGR Reprotest BV). Coated paper strips (4 mm×22 mm) are printed with inked aluminum disks at a printing pressure of 36 Newtons (N) with the pendulum drive system and the medium viscosity test oil from Reprotest BV. After printing, the distance where the coating begins to show damage is marked under a stereomicroscope. The marked distance is then transferred into the IGR velocity curve and the velocities in centimeters per second (cm/s) are read on the used drive curve. Higher velocities indicate high resistance to dry pick. As illustrated in FIG. 2D, an essentially identical coating binding strength for all the above listed coating compositions (both PVAc-based latex (homopolymer) and those containing the PVOH) is observed.

Finally, the coating compositions that include the PVAc-based latex show good opacity, comparable ISO brightness, and comparable OBA carrying efficiency (measured by ISO brightness with UV light) as compared to the coating compositions containing the PVOH. The ISO brightness is measured according to ISO 2469.2470, using a Technidyne Color Touch 2 (ISO model) with a D65 light source.

Example 2

500 g of a polyvinyl acetate-butyl acrylate copolymer XU 31631 (The Dow Chemical Company, Midland Mich.) containing 50.4 weight percent solids is partially hydrolyzed at room temperature by adding 174.4 g of a 10% by weight sodium hydroxide solution. This amount of base corresponds to a 20% hydrolysis of the acetate functionality groups in the PVAc-particles. The pH of the dispersion decreasing over time from around pH 13 down to around pH 9.5 after 3 days. The resulting PVAc-based latex shows good storage stability over at least 2 months.

The PVAc-based latex is then blended with a styrene butadiene binder DL 920 (The Dow Chemical Company, Midland Md. at 12.5%, 25%, 37.5%, and 50% by weight of total polymer content of the blend. Each of the resulting blends is then used at 10 parts dry polymer in a coating composition containing 100 parts calcium carbonate sold under trade designator HYDROCARB 90 (Omya, Inc, Vermont) and 1 part OBA sold under trade designator TINOPAL ABP-Z (Ciba Specialty Chemicals, Basel Switzerland).

The pH of the coating composition is then adjusted to pH 8.5 with a 10% by weight NaOH solution and to a solid composition of 70%. The different coating compositions are then coated onto wood-free paper and compared to formulations prepared with a PVOH in powder form sold under the trade designator Mowiol 6-98 (Kuraray Co. Ltd., Tokyo, Japan). The levels of the PVOH are 0.25, 0.5, 0.75 and 1 part based on 100 parts pigment.

The viscosity of the coating compositions containing the PVAc-based latex and those containing the PVOH are then compared. FIGS. 2A-2E illustrate comparisons of the coating compositions that include the Mowiol 6-98 and those that contain the PVAc-based latex. As illustrated in FIG. 2A, the coating compositions that include the PVAc-based latex (copolymer) provide a similar Brookfield viscosity (spindle 4 at 100 rpm) for the equivalent number of hydroxyl groups in the coating compositions.

FIG. 2B illustrates that the coating compositions that include the PVAc-based latex have a lower viscosity at increasing shear rates as compared to those containing the PVOH. For this test, the viscosity is measured with the Physica MCR 301 cone-plate rheometer as discussed above.

The ACAV A2 capillary rheometer (ACA Systems, Oy, Finland), as discussed above, is used to measure the high-shear viscosity of the coating compositions provided above. FIG. 2C provides results that indicate that the coating compositions that include the PVAc-based latex (copolymer) have a lower viscosity at increasing shear rates as compared to those containing the PVOH.

The coating binding strength for the coating compositions are also measured using IGT Pick testing, as discussed above. As illustrated in FIG. 2D, an essentially identical coating binding strength for all the above listed coating compositions (both PVAc-based latex (copolymer) and those containing the PVOH) is observed. Finally, the coating compositions that included the PVAc-based latex show good opacity, comparable ISO brightness, and comparable OBA carrying efficiency (measured by ISO brightness with UV light) as compared to the coating compositions containing the PVOH. The ISO brightness is measured as discussed above.

Example 3

1.25 part of each of the PVAc-based latex for Example 1 and Example 2 are blended with 8.75 parts of the styrene butadiene binder DL 920 (The Dow Chemical Company, Midland Mich.). 10 parts of the above formulated latexes are then blended with 100 parts clay pigment sold under the trade designator Capim SP (Imerys, France), 1 part TINOPAL ABP-Z (Ciba Specialty Chemicals, Basel Switzerland), and 0.35 part thickener sold under the trade designator DST 3250 (The Dow Chemical Company, Midland Mich.).

The pH of each coating composition is then adjusted to pH 8.5 with a 10% by weight NaOH solution and to a solid composition of 63%. The different coating compositions are then coated onto wood free paper and compared to formulations prepared with 0.25 parts Mowiol 6-98 and 9.75 parts styrene butadiene binder DL 920.

Figure 3A:
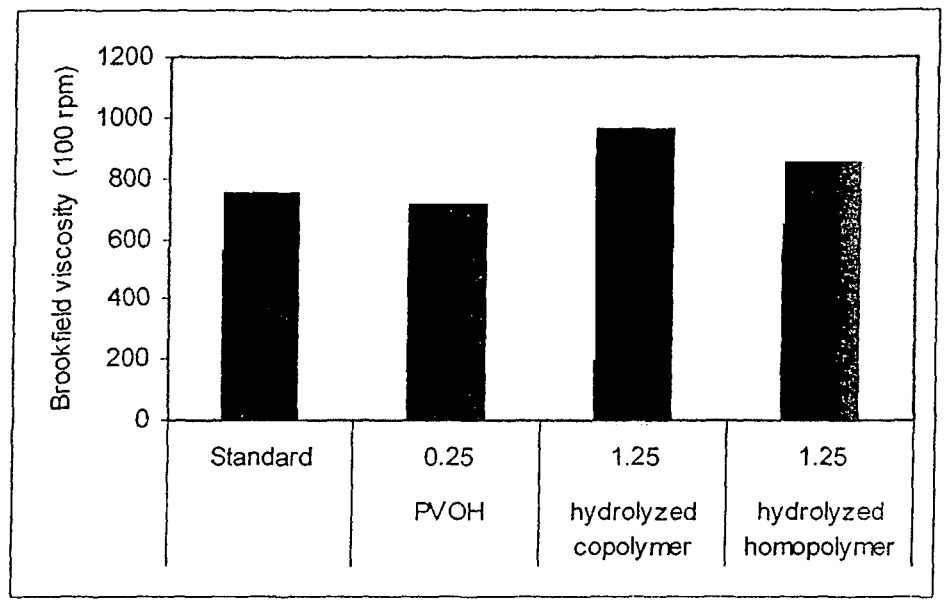
FIGS. 3A-3C illustrate viscosity (FIG. 3A), Deltack Passes-to-fail test (FIG. 3B) and fluorescence (FIG. 3C) test results for coating compositions having PVAc-based latexes of the present disclosure as compared to a coating composition having PVOH.

The viscosity of the coating compositions containing the PVAc-based latex and those containing the PVOH are then compared. The coating compositions that include the PVAc-based latex provided a higher Brookfield viscosity (FIG. 3A), which allows for reduction in the thickener.

Figure 3B:
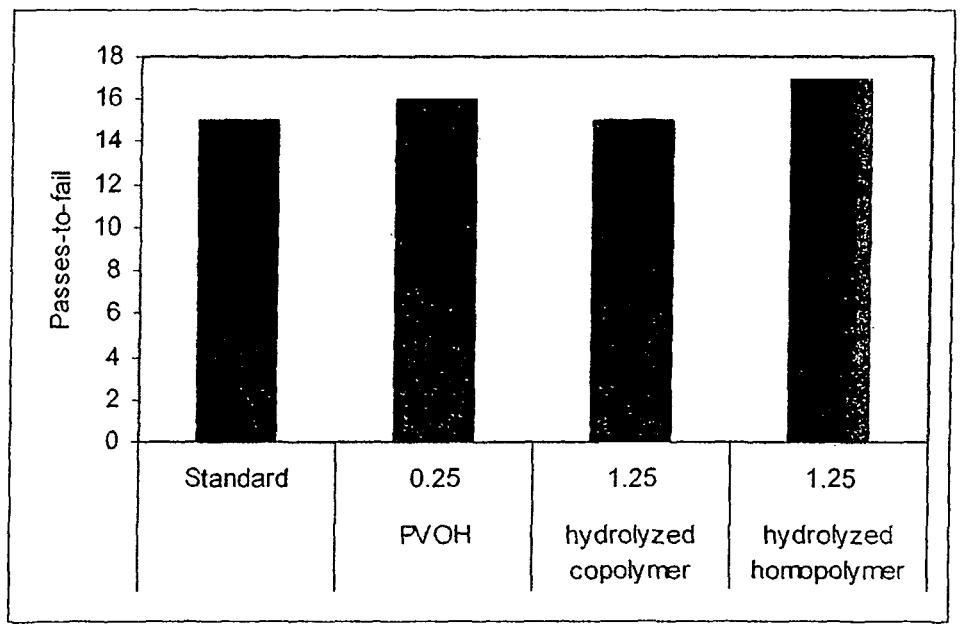

The coating binding strength for the coating compositions is measured using a passes-to-failure test. As illustrated in FIG. 3B, an essentially identical coating binding strength for all the above listed coating compositions (both PVAc-based latex (homopolymer and copolymer) and those containing the PVOH) is observed. The passes-to-failure are tested on a Pruefbau printability tester. Paper strips are printed with an ink commercially available under the trade designator Huber Wegschlagfarbe No. 520068. A starting amount of 190 microliters (µl) is applied to an ink distribution roll. A steel printing disk is inked to achieve an ink volume of 30 µl. A coated paper strip is then mounted on the test equipment and printed with the inked steel disk at a speed of 0.5 m/s and a printing pressure of 800 N. After a 3-second delay time, the paper strip is re-printed using the same steel reel. This procedure is repeated until the surface of the coated paper strip ruptures. The number of printing passes required to rupture the coated paper surface is a measure of the surface strength of the paper.

Figure 3C:
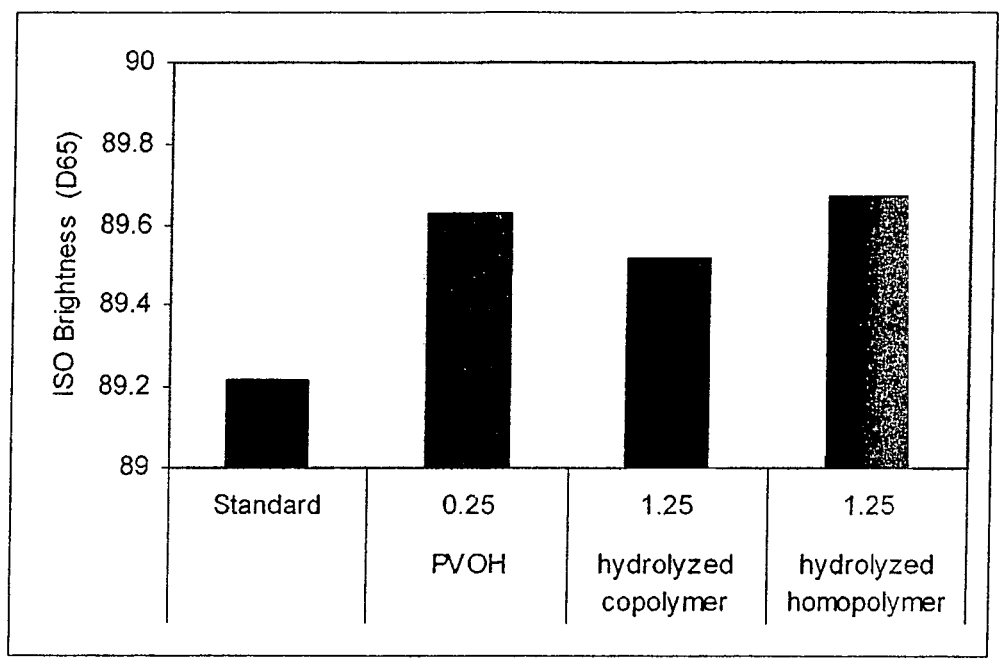

The coating compositions that include the PVAc-based latex also show improved opacity, improved CIE whiteness (FIG. 3C) and improved OBA carrying efficiency (measured by fluorescence with UV light) as compared to the coating compositions containing the PVOH.

What is claimed is:

1. A coating composition, comprising:
   a polyvinyl ester-based latex comprising polyvinyl ester-based particles with vinyl ester groups partially hydrolyzed to a predetermined degree, wherein the predetermined degree of hydrolysis is from about 10 to about 50 percent of the vinyl ester groups; and
   an optical brightening agent, wherein the polyvinyl ester-based particles act as a carrier for the optical brightening agent.

2. The composition of claim 1 wherein the polyvinyl ester-based latex comprises a polyvinyl acetate-based latex comprising acetate groups partially hydrolyzed to a predetermined degree.

3. The coating composition of claim 1, further comprising a binder, wherein the polyvinyl ester-based particles and the binder are present in an amount from about 0.125 to about 3 parts of polyvinyl ester-based particles to binder, and the binder is selected from the group consisting of styrene butadiene, carboxylated styrene butadiene, styrene butadiene acrylonitrile, carboxylated styrene butadiene acrylonitrile, styrene acrylate, carboxylated styrene acrylate, (carboxymethyl)cellulose, starch, polyvinyl alcohol, polyvinyl acetate homopolymers and copolymers, ethylene vinyl acetate copolymers, and combinations thereof.

4. The coating composition claim 3, further comprising a pigment, wherein the polyvinyl ester-based particles and the binder are present in an amount from about 3 parts to about 25 parts of combined polyvinyl ester-based particles and binder per 100 parts pigment.

5. The coating composition of claim 1, wherein the polyvinyl ester-based particles comprise homopolymers or copolymers formed from monomers selected from the group consisting of vinyl acetate, vinyl propionate, and vinyl butyrate.

6. The coating composition of claim 1, wherein the polyvinyl ester-based particles comprise copolymers formed from monomers selected from the group consisting of vinyl acetate, vinyl propionate, vinyl butyrate, and at least one other dissimilar monomer.

7. A method of preparing the coating composition of claim 1, comprising:
   providing a polyvinyl ester-based latex comprising polyvinyl ester-based particles that comprise vinyl ester groups; and
   partially hydrolyzing a predetermined percentage of the vinyl ester groups of the polyvinyl ester-based particles.

8. The coating composition of claim 1, wherein the coating composition is substantially free of polyvinyl alcohol.

* * * * *

UNITED STATES PATENT AND TRADEMARK OFFICE
CERTIFICATE OF CORRECTION

PATENT NO. : 8,647,427 B2
APPLICATION NO. : 12/934485
DATED : February 11, 2014
INVENTOR(S) : Lazarus et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 357 days.

Signed and Sealed this

Twenty-ninth Day of September, 2015

Michelle K. Lee
*Director of the United States Patent and Trademark Office*